US009292548B2

(12) United States Patent
Gopal et al.

(10) Patent No.: US 9,292,548 B2
(45) Date of Patent: Mar. 22, 2016

(54) DIGEST GENERATION

(75) Inventors: Vinodh Gopal, Westborough, MA (US);
James D. Guilford, Northborough, MA (US); Schuyler Eldridge, Brookline, MA (US); Gilbert M. Wolrich, Framingham, MA (US); Erdinc Ozturk, Marlborough, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 13/995,236

(22) PCT Filed: Nov. 1, 2011

(86) PCT No.: PCT/US2011/058802
§ 371 (c)(1),
(2), (4) Date: Jun. 18, 2013

(87) PCT Pub. No.: WO2013/066320
PCT Pub. Date: May 10, 2013

(65) Prior Publication Data
US 2013/0290285 A1    Oct. 31, 2013

(51) Int. Cl.
*G06F 17/30*    (2006.01)
(52) U.S. Cl.
CPC ...... *G06F 17/30303* (2013.01); *G06F 17/3033* (2013.01); *G06F 17/30306* (2013.01)
(58) Field of Classification Search
None
See application file for complete search history.

(56) References Cited

U.S. PATENT DOCUMENTS

| 7,142,669 | B2  | 11/2006 | Dworkin et al. | |
| 7,243,289 | B1  | 7/2007  | Madhusudhana et al. | |
| 2008/0010463 | A1 | 1/2008 | Eastlake | |
| 2009/0282148 | A1 | 11/2009 | Wong et al. | |
| 2013/0179759 | A1* | 7/2013 | Aronovich et al. | 714/807 |
| 2014/0052704 | A1* | 2/2014 | Mittal | 707/696 |

FOREIGN PATENT DOCUMENTS

WO    2013/066320 A1    5/2013

OTHER PUBLICATIONS

International Preliminary Report on Patentability and Written Opinion received for PCT Patent Application No. PCT/US2011/058802, mailed on May 15, 2014, 5 pages.
Intel, "Intel 64 and IA-32 Architectures Software Developer's Manual", vol. 2 (2A & 2B): Instruction Set Reference, May 2011, 27 pages.

(Continued)

*Primary Examiner* — Rehana Perveen
*Assistant Examiner* — Raheem Hoffler
(74) *Attorney, Agent, or Firm* — Christopher K. Gagne

(57) ABSTRACT

In one embodiment, circuitry may generate digests to be combined to produce a hash value. The digests may include at least one digest and at least one other digest generated based at least in part upon at least one CRC value and at least one other CRC value. The circuitry may include cyclical redundancy check (CRC) generator circuitry to generate the at least one CRC value based at least in part upon at least one input string. The CRC generator circuitry also may generate the at least one other CRC value based least in part upon at least one other input string. The at least one other input string resulting at least in part from at least one pseudorandom operation involving, at least in part, the at least one input string. Many modifications, variations, and alternatives are possible without departing from this embodiment.

25 Claims, 5 Drawing Sheets

(56) References Cited

OTHER PUBLICATIONS

Gopal et al., "Fast, Parallelized CRC Computation Using the Nehalem CRC32 Instruction", Apr. 12, 2011, 4 pages. Web link available at: http://www.drdobbs.com/parallel/fast-parallelized-crc-computation-using/229401411.

International Search Report and Written Opinion received for PCT Patent Application No. PCT/US2011/058802, mailed on Mar. 27, 2012, 8 pages.

Intel® 64 and IA-32 Architectures Software Developer's Manual, vol. 2 {2A & 2B}: Instruction Set Reference, A-Z, Order No. 325383-039US, May 2011, 27 pages.

Fast, Parallelized CRC Computation Using the Nehalem CRC32 Instruction, A fast and efficient method of computing a Cyclic Redundancy Check (CRC) on Intel processors for the fixed (degree-32) iSCSI polynomial, using the CRC32 instruction introduced in Intel Core i7 processors, Apr. 12, 2011, 4 pages.

"SpookyHash: a 128-bit noncryptographic hash," http://burtleburtle.net/bob/hash/spooky.html, retrieved from website Aug. 11, 2015 (3 pages).

Source Code related to "SpookyHash: a 128-bit noncryptographic hash," http://burtleburtle.net/bob/c/spooky.h; http://burtleburtle.net/bob/c/spooky.cpp; http://burtleburtle.net/bob/c/testspooky.cpp; retrieved from website Aug. 11, 2015 (23 pages total).

"Two New Block Ciphers," http://burtleburtle.net/bob/crypto/myblock.html, retrieved from website Aug. 11, 2015 (6 pages total).

"Hash Functions and Block Ciphers," http://burtleburtle.net/bob/hash/index.html#one-way, retrieved from website Aug. 11, 2015 (5 pages total).

"Minimal Perfect Hashing," http://burtleburtle.net/bob/hash/perfect.html, retrieved from website Aug. 11, 2015 (7 pages total).

"A Hash Function for Hash Table Lookup," http://burtleburtle.net/bob/hash/doobs.html, retrieved from website Aug. 11, 2015 (15 pages total).

"Cityhash—The CityHash family of hash functions—Google Project Hosting," https://code.google.com/p/cityhash/, retrieved from website Aug. 11, 2015 (1 pages total).

Bob Jenkins, "Lookup2.c," http://burtleburtle.net/bob/c/lookup2.c, 1996 (9 pages).

Bob Jenkins, "Lookup3.c," http://burtleburtle.net/bob/c/lookup3.c, 1996 (19 pages).

* cited by examiner

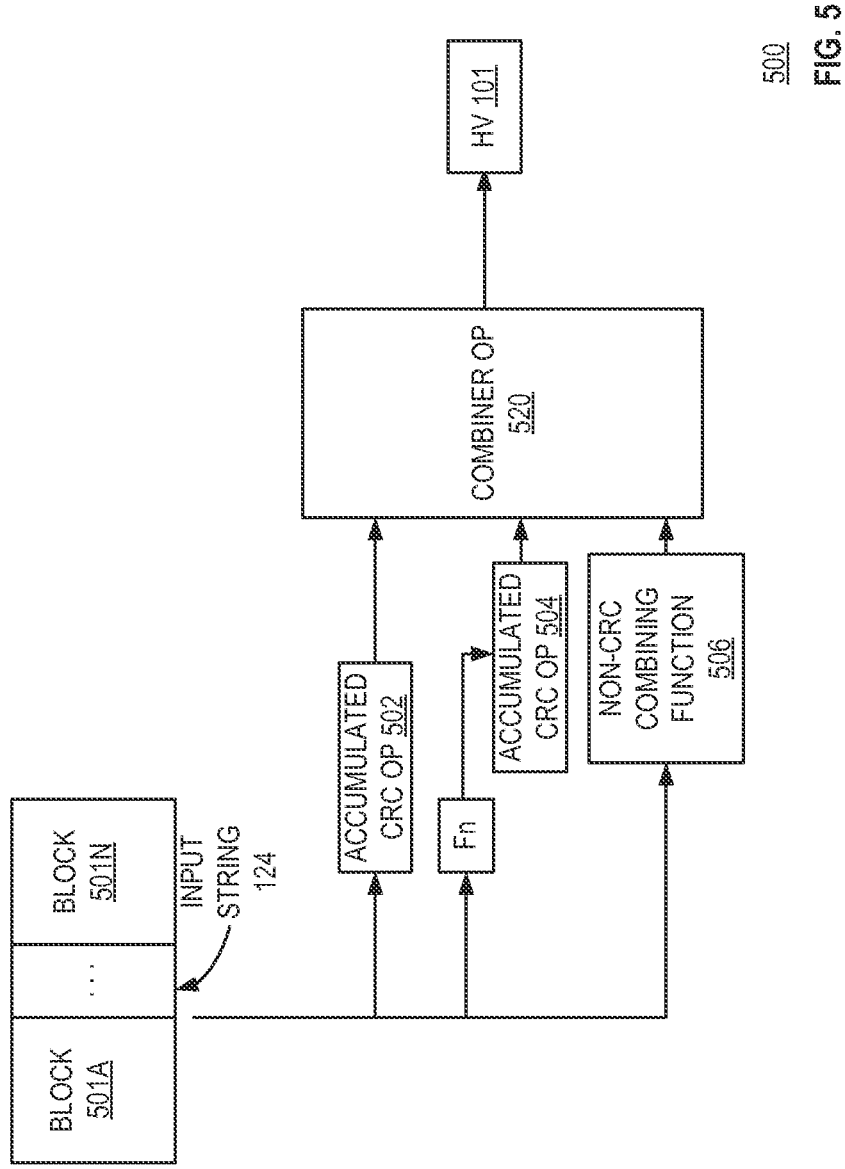

DIGEST GENERATION

FIELD

This disclosure relates to generation of digests that may be combined to produce a hash value.

BACKGROUND

In one conventional arrangement, tuples of data items are stored in a data store. The tuples are searchable based upon the data items in the tuples. In order to increase the speed and/or efficiency of the searching of the tuples, one or more respective data items in each of the respective tuples are hashed to produce respective hash values, and the respective hash values are used as indices to the respective tuples.

In order to be able to meaningfully improve the speed and/or efficiency of searching a typical data store, it is desirable that the employed hash algorithm results in relatively few collisions, consume relatively few compute cycles and/or bandwidth, and be able to operate efficiently upon variable length inputs. Unfortunately, typical hash algorithms have been unable to achieve some or all of these results, at least to sufficient degree, to permit such typical algorithms to be able to meaningfully improve the speed and/or efficiency of such searching.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which:

FIG. 5 illustrates features in an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
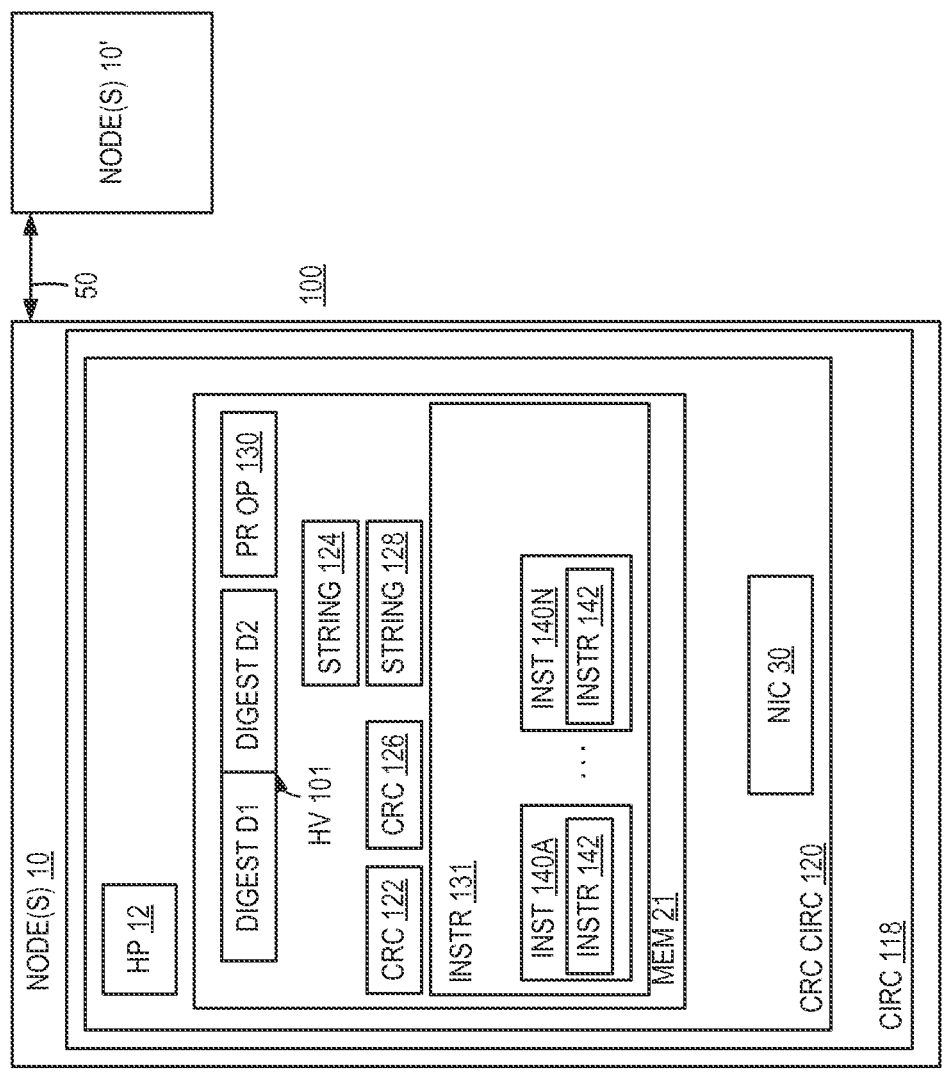
FIG. 1 illustrates a system embodiment.

FIG. 1 illustrates an exemplary system embodiment 100. System 100 may include one or more network nodes 10 that may be communicatively coupled via one or more wireless and/or wired communication links 50 to one or more other network nodes 10'. In this embodiment, a "network node" or "node" may be used interchangeably to mean an entity communicatively coupled in and/or to a network, such as, for example, an end station, appliance, intermediate station, network interface, client, server, and/or portion thereof. In this embodiment, a "network" may be or comprise two or more nodes that are communicatively coupled together. Also in this embodiment, a node may be "communicatively coupled" to another node if the one node is capable of transmitting to and/or receiving from the other node one or more packets. As used herein, a "wireless communication link" means any modality, and/or portion thereof that permits, at least in part, at least two nodes to be wirelessly communicatively coupled, at least in part. Also as used herein, a "wired communication link" means any modality and/or portion thereof, that permits, at least in part, at least two nodes to be communicatively coupled, at least in part, via non-wireless means, at least in part. As used herein, a "packet" may comprise one or more symbols and/or values.

In this embodiment, as shown in FIG. 1, one or more nodes 10 may comprise operative circuitry 118. Circuitry 118 may comprise cyclical redundancy check (CRC) generator and/or decoder circuitry 120. CRC circuitry 120 may comprise one or more host processors (HP) 12, computer-readable/writable memory 21, and/or network interface controller (NIC) 30. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry. Each of the host processors 12 may be coupled to computer-readable/writable memory 21 via a not shown memory hub system. The one or more host processors 12 may comprise, for example, one or more single and/or multi-core Intel® (and/or other type of) microprocessors (and/or chipsets). In this embodiment, a "processor" may comprise circuitry capable of performing, at least in part, one or more arithmetic and/or logical operations. In this embodiment, an arithmetic operation may comprise, result from, and/or result in, at least in part, one or more mathematical operations, such as, for example, (1) one or more addition, subtraction, multiplication, and/or division operations, and/or (2) one or more rotation and/or shift operations. Such arithmetic operations may (but are not required to be) in accordance with, at least in part, the carry-less mathematics of the finite field $GF(2)$. Also, in this embodiment, a logical operation may comprise, result from, and/or result in, at least in part, one or more logical and/or Boolean operations, such as, for example, one or more group-wise and/or bit-wise logical exclusive-or (XOR), OR, AND, and/or NOT (inversion) operations. Although not shown in the Figures, one or more nodes 10 also may comprise a user interface system that may comprise, e.g., a keyboard, pointing device, and display system that may permit a human user to input commands to, and monitor the operation of, node 10, node 10', and/or system 100. NIC 30 may permit one or more nodes 10 to be communicatively coupled via one or more communication links 50 to one or more nodes 10'.

One or more machine-readable program instructions 131 may be stored in computer-readable/writable memory 21. In operation of one or more nodes 10, these instructions may be accessed and executed by one or more host processors 12 and/or NIC 30. When executed by one or more host processors 12 and/or NIC 30, these one or more instructions may result in operative circuitry 118, CRC circuitry 120, host processor 12, and/or NIC 30 performing the operations described herein as being performed by operative circuitry 118, CRC circuitry 120, host processor 12, and/or NIC 30. Computer-readable/writable memory 21 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

Although not shown in the Figures, without departing from this embodiment, some or all of circuitry 118, CRC circuitry 120, one or more host processors 12, memory 21 (and/or the contents of memory 21), NIC 30, and/or the operations described as being performed by these components of one or more nodes 10, may be comprised in and/or performed by, at least in part, in special purpose circuitry in one or nodes 10. Also without departing from this embodiment, such special purpose circuitry may be comprised, at least in part, in one or more of these and/or other components (e.g., one or more not shown chipsets) of one or more nodes 10.

One or more nodes 10' may comprise respective (not shown) operative circuitry and/or CRC generator and/or decoder circuitry whose construction and operation may conform, in whole or in part, to the construction and operation of circuitry 118 and/or CRC circuitry 120. Of course, without departing from this embodiment, the construction and/or operation of one or more nodes 10' may different in whole or in part from the construction and/or operation of one or more nodes 10.

One or more communication links 50 may be compatible with one or more communication protocols. For example, in this embodiment, one or more links 50 may be compatible with, e.g., Ethernet protocol and/or Transmission Control Protocol/Internet Protocol (TCP/IP) protocol. Additionally or alternatively, one or more links 50 may be compatible with, e.g., one or more wireless communication protocols.

The Ethernet protocol that may be used in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol that may be used in system 100 may comply or be compatible with the protocols described in Internet Engineering Task Force (IETF) Request For Comments (RFC) 791 and 793, published September 1981. Additionally or alternatively, the one or more wireless communication protocols that may be used in system 100 may comply or be compatible with IEEE 802.11-1999: Wireless LAN Medium Access Control (MAC) and Physical Layer (PHY) Specifications, IEEE Working Group (1999-07-15), published 1999, IEEE, Inc., and/or other and/or later-developed wireless protocols. Of course, many different communication protocols may be used for such data and/or command exchange without departing from this embodiment.

Memory 21 may store, at least in part, one or more databases (DB) 402. One or more databases 402 may comprise one or more (and in this embodiment, a plurality of) tuples T1 . . . TN. Each of the tuples T1 . . . TN may comprise one or more (and in this embodiment, a plurality of) respective mutually associated values (AV) that may be associated, at least in part, with network-related entities. In the one or more databases 402, one or more respective hash values (HV) 404A . . . 404N may be used, at least in part, for each respective tuple T1 . . . TN to access the respective tuple T1 . . . TN and/or at least one of the respective associated values comprised in the respective tuple T1 . . . TN. For example, in one or more databases 402, tuple T1 may comprise associated values 406A . . . 406N, and tuple T1 and/or one or more of its associated values 406A . . . 406N may be accessible, at least in part, using one or more hash values 404A (e.g., using, at least in part, one or more hash values 404A as one or more indices and/or to generate one or more pointers into one or more databases 402). Also, for example, tuple TN may comprise associated values 408A . . . 408N, and tuple TN and/or one or more of its associated values 408A . . . 408N may be accessible, at least in part, using one or more hash values 404N (e.g., using, at least in part, one or more hash values 404N as one or more indices and/or to generate one or more pointers into one or more databases 402). In this embodiment, tuple T1 and/or the respective associated values comprised in tuple T1 may be associated, at least in part, with one or more physical, logical, and/or virtual components, addresses, and/or identifiers of, comprised in, and/or accessible via one or more nodes 10. Tuple TN and/or the respective associated values comprised in tuple TN may be associated, at least in part, with one or more physical, logical, and/or virtual components, addresses, and/or identifiers of, comprised in, and/or accessible via one or more nodes 10'. Of course, without departing from this embodiment, one or more databases, tuples T1 . . . TN, and/or the respective associated values in tuples T1 . . . TN may be or comprise other and/or additional types of information, such as, information that may be unrelated to and/or unassociated with, at least in part, one or more network-related entities. For example, such other and/or additional types of information may comprise, without limitation, textual, multimedia, audio, video, relational database, and/or other information.

In this embodiment, a database may comprise one or more tuples. Also in this embodiment, a tuple may comprise two or more values that are associated, at least in part, with each other. Also in this embodiment, a hash or hash value may comprise one or more values that may result, at least in part, from one or more arithmetic and/or logical operations. Additionally, in this embodiment, a CRC value may comprise one or more values that may be used, at least in part, to detect and/or correct one or more errors that may exist in one or more other values. In this embodiment, a CRC operation may generate, as an output, a CRC value, based at least in part upon an input value. In this embodiment, a digest may comprise one or more CRC values and/or one or more hash values. In this embodiment, a string may comprise one or more values. Also, in this embodiment, a network-related entity may comprise one or physical, logical, and/or virtual entities that may be comprised in, communicatively coupled to, addressable via, and/or accessible via, at least in part, directly or indirectly, a network.

In this embodiment, prior to transmitting a packet to one or more nodes 10' via one or more networks 50, one or more nodes 10 may access, using one or more hash values 404N, one or more databases 402 to determine information that is to be included in the packet. For example, such information may comprise one or more destination ports, subnets, addresses, etc., of and/or comprised in one or more nodes 10', and such information may be comprised in, at least in part, one or more of the associated values 408A . . . 408N that may be comprised in tuple TN. Node 10 may generate one or more hash values 404N based, at least in part, upon one or more input strings 124 (see FIG. 1) that may correspond to and/or comprise, at least in part, one or more other values that may be comprised, at least in part, in the one or more associated values 408N in tuple TN and/or in database 402.

For purposes of the following example, one or more hash values 101 (see FIG. 1) may correspond to, at least in part, and/or comprise, at least in part, one or more hash values 404N. In this embodiment, in order to generate one or more hash values 101, circuitry 118, CRC circuitry 120, one or more host processors 12, and/or NIC 30 may access and execute, at least in part, one or more instructions 131. This execution, at least in part, of one or more instructions 131 may result, at least in part, in circuitry 118, CRC circuitry 120, one or more host processors 12, and/or NIC 30 generating, at least in part, a plurality of digests (e.g., comprising digests D1 and/or D2) to be combined (e.g., at least in part by circuitry 118, CRC circuitry 120, one or more host processors 12, and/or NIC 30) to produce one or more hash values 101. For example, circuitry 118, CRC circuitry 120, one or more host processors 12, and/or NIC 30 may concatenate, at least in part, one or more digests D1 (e.g., by pre-pending, appending, and/or interspersing one or more digests D1) with one or more digests D2 to produce one or more hash values 101. In this embodiment, one or more digests D1 and/or one or more digests D2 may be generated based at least in part upon one or more CRC values 122 and/or one or more CRC values 126.

For example, in this embodiment, one or more digests D1 may be or comprise, at least in part, one or more CRC values 122, and/or one or more digests D2 may be or comprise, at least in part, one or more CRC values 126, respectively.

In this embodiment, CRC circuitry 120 may generate, at least in part, one or more CRC values 122 and/or one or more CRC values 126. CRC circuitry 120 may generate one or more CRC values 122 based, at least in part, upon one or more input strings 124. CRC circuitry 120 may generate, at least in part, one or more CRC values 126 based, at least in part, upon one or more input strings 128. One or more input strings 128 may result, at least in part, from one or more pseudorandom operations (PR OP, symbolically shown in FIG. 1 by block 130 in FIG. 1) that may involve, at least in part, one or more input strings 124.

For example, in an embodiment, in broad concept, circuitry 118 and/or 120 may carry out, at least in part, the operations 500 illustrated in FIG. 5. As shown in FIG. 5, as part of operations 500, one or more respective blocks 501A . . . 501N of one or more input strings 124 may be successively input to successive iterations of an accumulated CRC operation 502, a function Fn, and a non-CRC combining function 506. In each respective iteration, the output of the function Fn is provided as an input to an accumulated CRC operation 504. In each respective iteration, the function Fn may comprise one or more computationally inexpensive pseudorandom operations (e.g., one or more rotation and/or arithmetic operations) involving the respective one of the blocks 501A . . . 501N that is being input to function Fn in that respective iteration. In each respective iteration, the non-CRC combining function 506 may (1) utilize one or more logical operations, such as, for example, one or more XOR operations to modify the respective one of the blocks 501A . . . 501N that is being input to the non-CRC combining function 506 in that respective iteration and (2) combine, using a non-CRC operation, the result of the respective iteration of the one or more logical operation with the output of the non-CRC combining function from the most recent previous iteration (or an initial value thereof). After all of the blocks 501A . . . 501N have undergone processing in the above manner, the respective resultant outputs of accumulated CRC operation 502, accumulated CRC operation 504, and non-CRC combining function 506 may be input to one or more combiner operations 520.

One or more combiner operations 520 may utilize, as one or more digests D1, the input provided to one or more combiner operations 520 by accumulated CRC operation 502. One or more combiner operations 520 may generate one or more digests D2 by performing a CRC operation (e.g., an accumulated CRC operation) involving the respective inputs provided to one or more combiner operations 520 by accumulated CRC operation 504 and non-CRC combining function 506. One or combiner operations 520 may combine (e.g., concatenate) digests D1 and D2 to produce one or more hash values 101.

As will be appreciated, the number and/or types of operations that may be comprised in function Fn, operation 502, operation 504, and/or function 506, and/or the number of inputs that may be provided to one or more combiner operations 520, may vary (e.g., so as to comprise essentially any arbitrary number thereof), without departing from this embodiment. As also will be appreciated, the type of operations that may be comprised in one or more combiner operations 520 and/or the manner in which one or more combiner operations 520 may combine the inputs provided to one or more combiner operations 520 to produce one or more hash values 101 may vary, without departing from this embodiment.

Figure 2:
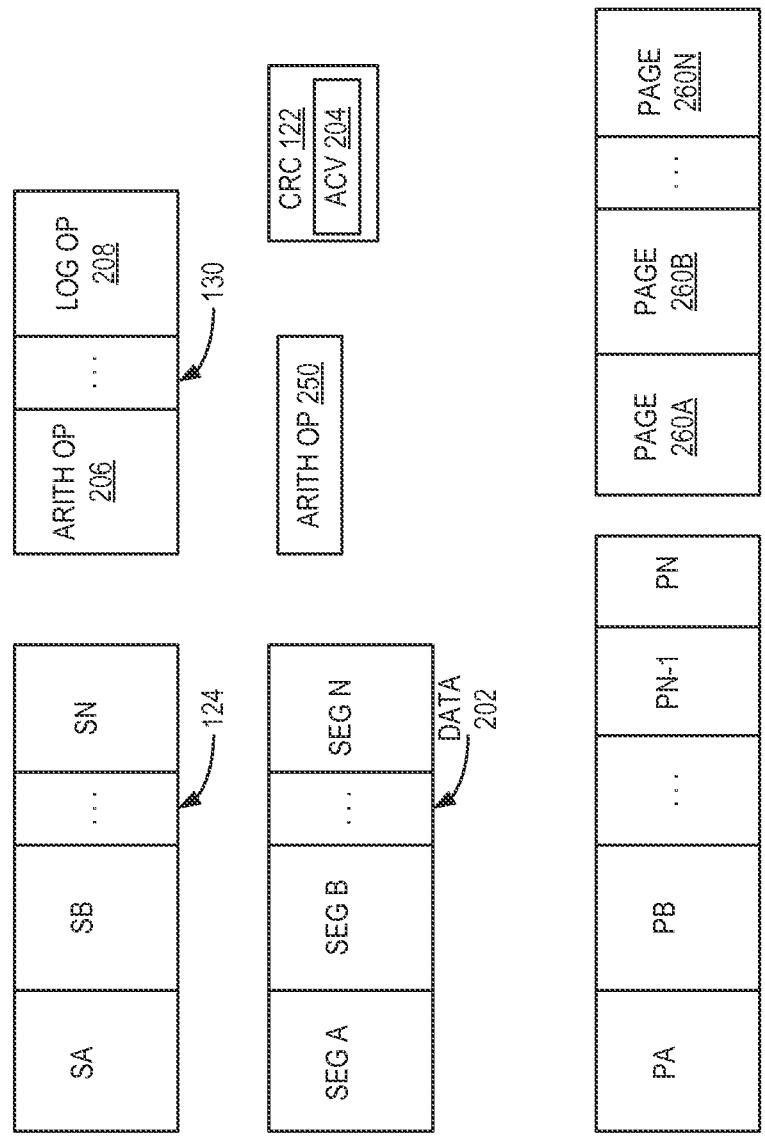
FIG. 2 illustrates features in an embodiment.

By way of illustrative example, as shown in FIG. 2, one or more input strings 124 may comprise one or more (and in this embodiment, a plurality of) respective input strings SA . . . SN that may correspond to, comprise, or be the same as, one or more (and in this embodiment, a plurality of) respective segments SEG A . . . SEG N of data 202 to hashed (e.g., in order to facilitate the production of one or more hash values 101). In this example, data 202 may correspond, at least in part, to the one or more values that may be comprised, at least in part, in the one or more associated values 408N in tuple TN and/or in database 402 that (as described above) one or more input strings 124 may correspond to and/or comprise, at least in part. In this embodiment, a portion, segment, subset, and/or fragment of an entity may comprise some or all of the entity. The respective numbers and/or sizes of input strings SA . . . SN and/or segments SEG A . . . SEG N may vary without departing from this embodiment. Also in this embodiment, input strings SA . . . SN may be mutually contiguous and/or non-contiguous with each other, at least in part, and/or segments SEG A . . . SEG N may be mutually contiguous and/or non-contiguous with each other, at least in part, respectively.

As shown in FIG. 2, in this embodiment, one or more CRC values 122 may comprise one or more accumulated CRC values (ACV) 204. ACV 204 may be calculated (e.g., at least in part by CRC circuitry 120) based at least in part upon the respective input strings SA . . . SN. The one or more pseudorandom operations 130 may comprise one or more arithmetic operations 206 and/or one or more logical operations 208. In this embodiment, an accumulated CRC value may be generated as an output of an accumulated CRC operation. In this embodiment, an accumulated CRC operation may generate an output value based at least in part upon both (1) a CRC value generated upon an input and (2) a previously stored value. For example, in this embodiment, such an accumulated CRC operation (1) may generate a CRC value based upon a current input value, and (2) may overwrite a previously stored value with an output value that is an accumulation (e.g., summing) of the CRC value with the previously stored value. One example of such an accumulated CRC operation may be or comprise one or more operations that may be executed in response to an Intel® CRC32—Accumulate CRC32 Value Instruction described in "Intel® 64 and IA-32 Architectures Software Developer Manual, Volume 2 (2A & 2B); Instruction Set Reference, A-Z, Order Number 325383-039US, May 2011, Intel Corporation. Of course, other and/or types of accumulated CRC operations may be used to advantage in this embodiment.

Figure 3:
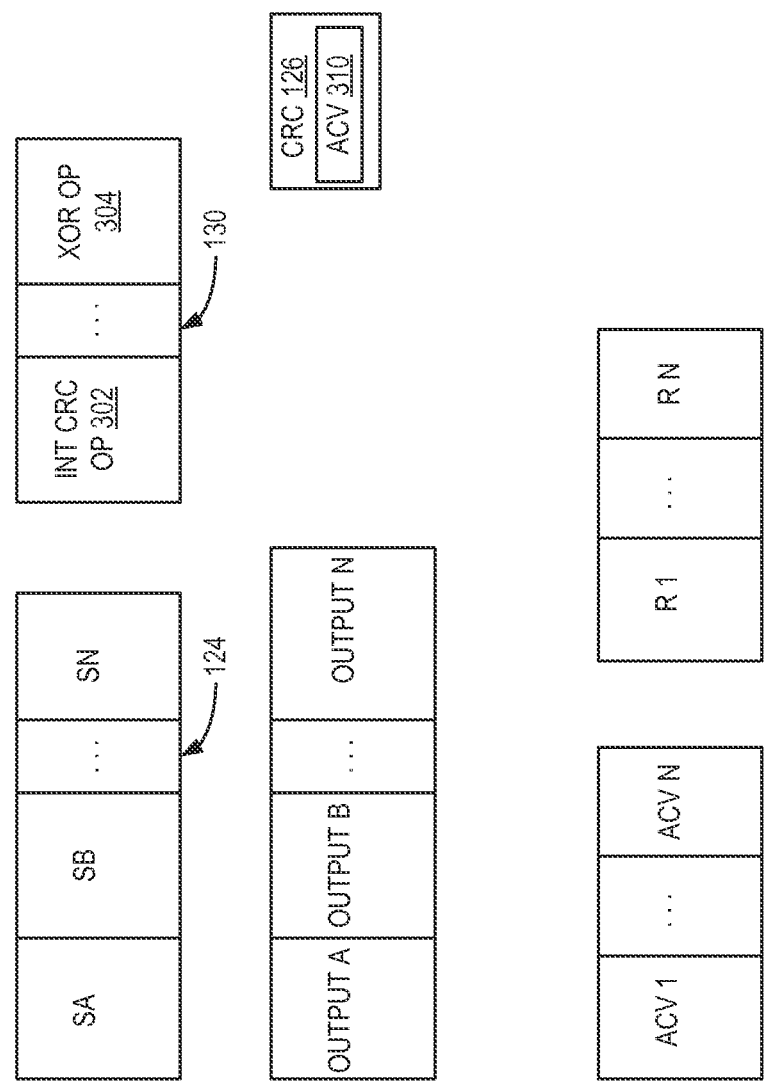
FIG. 3 illustrates features in an embodiment.
Figure 4:
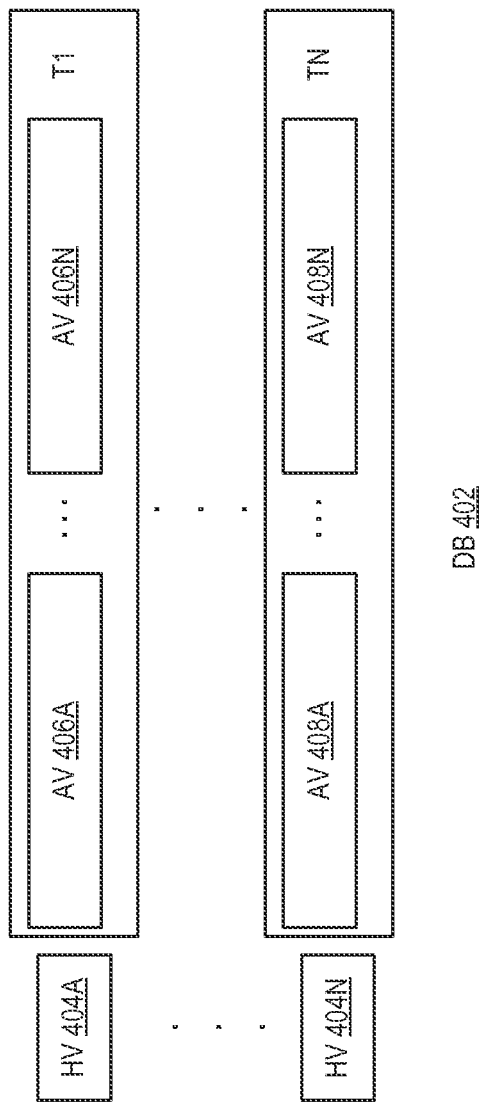
FIG. 4 illustrates features in an embodiment.

In this embodiment, one or more pseudorandom operations 130 may comprise one or more intermediate accumulated CRC operations 302 and/or one or more XOR operations 304 (see FIG. 3). In this example, the one or more intermediate accumulated CRC operations 302 may generate respective accumulated CRC values ACV 1 . . . ACV N, based at least in part upon respective rotations R 1 . . . R N of the respective input strings SA . . . SN. Also in this example, the one or more XOR operations 304 may generate, for each one of the respective input strings SA . . . SN, a respective current output value (e.g., of the respective XOR operation) OUTPUT A . . . OUTPUT N, by performing a respective XOR of a previous respective output value with the respective one of input strings SA . . . SN. One or more CRC values 126 may comprise one or more accumulated CRC values 310 that may be calculated based at least in part upon the respective accumulated CRC values ACV 1 . . . ACV N and the current respective output value OUTPUT A . . . OUTPUT N.

For example, in this embodiment, one or more instructions 131 may comprise one or more (and in this embodiment, a plurality of) respective instances 140A . . . 140N of a CRC instruction 142. In this embodiment, this CRC instruction 142 may be or comprise the aforesaid Intel® CRC32—Accumulate CRC32 Value Instruction. The CRC generator circuitry 120 may generate the one or more CRC values 122, one or more accumulated CRC values 204, one or more accumulated CRC values 310, respective accumulated CRC values ACV 1 . . . ACV N, and/or one or more CRC values 126 as a result, at least in part, of the respective execution of one or more of these respective instances 140A . . . 140N of the CRC instruction 142.

A pseudo code example, for use in describing the above and/or other operations in accordance with this embodiment, is presented below:

```
For Si (SA to SN):
    A = CRC(Si, A)
    B_intermediate = CRC(Si <<< 31, B_intermediate)
    accumulator = accumulator ^ Si
B = CRC(B_intermediate, accumulator)
```

In the above pseudo code example, the first line is intended to indicate that for each of the respective input strings SA . . . SN (or alternatively, for each of the respective segments SEG A . . . SEG N corresponding to the respective input strings SA . . . SN), starting with SA (or alternatively SEG A) and ending with SN (or alternatively SEG N), a respective iteration of a loop that comprises the next three lines of pseudo code is to be performed. After all of the iterations of the loop have been performed, one or more digests D1, one or more CRC values 122, and/or one or more ACV 204 may be or comprise, at least in part, the last value of the variable A. Also after all of the loop and the final line of the pseudo code have been performed, one or more digests D2, one or more CRC values 126, and/or one or more ACV 310 may be or comprise, at least in part, the last value of the variable B.

In the line, $$A = CRC(Si, A)$$

of the loop, an accumulated CRC operation involving the current value of the variable A and the current one (e.g., that is subject to the current iteration of the loop) of the input strings SA . . . SN (or alternatively, the current one of the segments SEG A . . . SEG N) is performed. More specifically, in the accumulated CRC operation, the current one of the input strings SA . . . SN (or alternatively, the current one of the segments SEC A . . . SEG N) undergoes a CRC operation to produce a CRC value that is accumulated with the current value of the variable A to produce an accumulated CRC value. This accumulated CRC value then is stored as (e.g., used to overwrite) the current value of the variable A.

In the line, $$B\_intermediate = CRC(Si <<< 31, B\_intermediate)$$

of the loop, the current one of the input strings (or alternatively, the current one of the segments) undergoes (e.g., 31 bit) rotate left operation (e.g., corresponding to or comprised in one or more operations 206) to produce a resultant rotated value (e.g., one of the rotations R 1 . . . R N). The resultant rotated value undergoes a CRC operation to produce a CRC value that is accumulated (in and/or as a result, at least in part, of intermediate accumulated CRC operation 302) with the current value of an intermediate accumulated CRC variable (B_intermediate) to produce an intermediate accumulated CRC value (e.g., one of the accumulated CRC values ACV 1 . . . ACV N). This intermediate accumulated CRC value is then stored as (e.g., used to overwrite) the current value of the variable B_intermediate.

In the line, $$accumulator = accumulator \char`\^ Si$$

of the loop, the current one of the input strings (or alternatively, the current one of the segments) undergoes bitwise XOR operation (e.g., corresponding to or comprised in one or more operations 208 and/or 304) with the current value of an accumulator variable (accumulator) to produce an output value (e.g., one of the output values OUTPUT A . . . OUTPUT N). For example, if the output value produced in this current iteration of the loop is OUTPUT B, then the current value of the accumulator variable that is used to generate this output value (i.e., OUTPUT B) may be the value OUTPUT A, etc. The output value produced by the current iteration of the loop is then stored as (e.g., used to overwrite) the current value of the accumulator variable. Prior to commencing the iterations of the loop, the accumulator variable may be initially set to a value of zero. Other variables (e.g., one or more of the variables A, B, and/or B_intermediate) may not be so initialized prior to the commencing the loop iterations.

In the line, $$B = CRC(B\_intermediate, accumulator)$$

of the pseudo code, after the loop has been exited, the current value of the B_intermediate variable undergoes a CRC operation to produce a CRC value that is accumulated with the current value of the accumulator variable to produce a resultant value. This resultant value is then stored as (e.g., used to overwrite) the current value of the variable B.

Of course, the foregoing is merely exemplary and many variations are possible. For example, the sequence order in which at least some of the above lines of the loop may be carried out may vary from that described. Other modifications are also possible, including those described below.

In this embodiment, depending upon the particular manner in which the above and/or other operations may be performed, circuitry 118, CRC circuitry 120, one or more host processors 12, and/or NIC 30 may access respective segments SEG A . . . SEG N (or alternatively, their respective corresponding strings SA . . . SN) based at least in part upon respective pointers PA . . . PN to the respective segments SEG A . . . SEG N (or alternatively, to their respective corresponding strings SA . . . SN). These pointers PA . . . PN may be generated, at least in part, by circuitry 118, CRC circuitry 120, one or more host processors 12, and/or NIC 30. For example, the pointers PA . . . PN may include one or more pointers PIN to be used to access a final segment SEG N or final string SN (e.g., the segment SEG N or string SN that is subject to the final iteration in the above pseudo code loop) to be processed to produce hash value 101. These one or more pointers PN may be initially generated by circuitry 118, CRC circuitry 120, one or more host processors 12, and/or NIC 30 based at least in part upon one or more arithmetic operations 250 involving one or more other pointers (e.g., one or more pointers PN−1). However, after this initial generation of one or more pointers PN, circuitry 118, CRC circuitry 120, one or more host processors 12, and/or NIC 30 may modify one or more pointers PN, if appropriate under the circumstances, so as to permit the one or more pointers PN, as so modified, to be used to correctly access the final segment SEG N or string SN.

For example, depending upon the particular implementation of the above and/or other operations, pointers PA . . . PN−1 and one or more pointers PN (as initially generated) may be calculated to access segments SEG A . . . SEG N (or alternatively, strings SA . . . SN) of uniform and/or predetermined size (e.g., 8 bytes). If, however, the final segment SEG N (or string SA) is other (e.g., smaller) than this predetermined size, one or more pointers PN may be modified so as to permit the final segment SEG N (or string SA) to be correctly accessed (e.g., so as not to access data that is not comprised in data 202). This modification may involve one or more arithmetic operations 250 to appropriately adjust one or more pointers PN.

Also, for example, memory 21 may comprise multiple memory pages 260A . . . 260N (see FIG. 2). Data 202 may straddle (e.g., be stored in) two or more of the memory pages (e.g., page 260A and 260B). For example, final segment SEG N or final string SN may be located in memory page 260B, while the other segments of segments SEG A . . . N or strings SA . . . SN may be located in another memory page 260A. In this situation, depending upon the manner in which pointers and/or memory references are resolved (e.g., in the code compilation process) one or more arithmetic operations 250 may appropriately modify (e.g., based upon the sizes of pages 260A and/or 260B and/or other parameters) one or more pointers PN so as to enable the final segment SEG N or final string SN to be correctly accessed.

Possible assembly code instructions that may be used in implementing, at least in part, at least some of the foregoing and/or other operations in accordance with this embodiment may comprise the instructions (and/or other instructions) set forth below; however, the below is only an example, and many variations are possible without departing from this embodiment:

```
        ; %define LINUX
        %ifndef LINUX
        ; window's register assignments
        %define p_data    rcx
        %define len       rdx
        %define p_A       r8
        %define p_B       r9
        %define A         r10
        %define A_d       r10d
        %define B         r11
        %define B_d       r11d
        %define data      rax
        %define tmp       rbx
        %define saved_data rdi
        %else
        ; linux's register assignments
        %define p_data    rdi
        %define len       rsi
        %define p_A       rdx
        %define p_B       rcx
        %define A         r10
        %define A_d       r10d
        %define B         r11
        %define B_d       r11d
        %define data      rax
        %define tmp       r8
        %define saved_data r9
        %endif
        global hash_function_example
hash_function_example:
        push      rbx
        %ifndef LINUX
        push      rdi
        %endif
        mov       A_d, [p_A]
        mov       B_d, [p_B]
        mov       saved_data, 0
        crc32     A, len
        crc32     B, len
        cmp       len, 0
        jz        finish
        sub       len, 8
        jl        lt_8_bytes
        jz        exactly_8
        ; process 8 bytes
proc_8_bytes:
        mov       data, [p_data]
        crc32     A, data
        xor       saved_data, data    ; recursive operation
        rol       data, 31            ; recursive rotate
        crc32     B, data
        add       p_data, 8
        sub       len, 8
        jg        proc_8_bytes
exactly_8:
        ; 1...8 bytes remaining; at least 8 bytes originally valid
        ; −8 < len <= 0
        mov       data, [p_data + len]
        crc32     A, data
        xor       saved_data, data
        rol       data, 31            ; recursive rotate
        crc32     B, data
        crc32     B, saved_data       ; final step
finish:
        mov       [p_A], A_d
        mov       [p_B], B_d
%ifndef LINUX
        pop       rdi
%endif                                ;
        pop       rbx
        ret
lt_8_bytes:
        ; −8 < len < 0 corresponds to an actual length 0 < len < 8
        mov       tmp, p_data
        and       tmp, 4095           ; alignment wrt pages
        cmp       tmp, 4096−8
        jg        straddles_page
        ; data does not straddle page
        mov       data, [p_data]
        lea       tmp, [MASKS + 8*8 wrt rip]
        and       data, [tmp + 8*len]
proc_last_data:
        crc32     A, data
        xor       saved_data, data    ; recursive operation
        rol       data, 31            ; recursive rotate
        crc32     B, data
        crc32     B, saved_data       ; final operation
        mov       [p_A], A_d
        mov       [p_B], B_d
%ifndef LINUX
        pop       rdi
%endif
        pop       rbx
        ret
straddles_page:
        ; data might straddle page
        ; len is (actual_length − 8)
        mov       data, [p_data + len]
        ;; data in MSB of data, shift right by 8*(8−len)
%ifdef LINUX
        mov       p_data, rcx
%endif
        lea       rcx, [8*len]
        neg       rcx
        shr       data, cl
%ifdef LINUX
        mov       rcx, p_data
%endif
        jmp       proc_last_data
section .data
align 8
MASKS:
        dq        0x0000000000000000
        dq        0x00000000000000FF
        dq        0x000000000000FFFF
        dq        0x0000000000FFFFFF
        dq        0x00000000FFFFFFFF
        dq        0x000000FFFFFFFFFF
```

-continued

| | |
|---|---|
| dq | 0x0000FFFFFFFFFFFF |
| dq | 0x00FFFFFFFFFFFFFF |

Of the course, the foregoing is merely exemplary and many modifications are possible. By way of illustration, in a modification, alternatively or additionally to the operations comprised in the pseudo code loop described previously, variable A may be calculated based at least in part upon multiple accumulated CRC operations involving, at the beginning of the loop, the respective strings SA . . . SN and/or, at the end of the loop, the length of the data 202. In this modification, variable B may be calculated based at least in part upon multiple accumulated CRC operations involving, at the beginning of the loop, each of the respective strings SA . . . SN reduced by a constant (e.g., a constant may be subtracted from each respective string SA . . . SN and the result used in respective accumulated CRC operations), and/or, at the end of the loop, the length of the data 202. In another modification, the accumulated CRC operations involving the length of the data 202 may be moved to the beginning of the loop, and variable B may be calculated based at least in part upon respective accumulated CRC operations involving the respective strings SA as rotated by a constant number of bits. In yet another modification, the variable B may be calculated based at least in part upon respective accumulated CRC operations involving the respective strings SA, as first reduced by a constant, and subsequently rotated by a constant number of bit.

Other modifications are also possible. For example, the A variable and B variable may be initialized to values resulting from respective accumulated CRC operations involving the length of data 202. An accumulator variable may be initialized to the length of data 202, as rotated by predetermined number of bits. Thereafter, in the loop, the A variable may be calculated based at least in part upon accumulated CRC operations involving the strings SA . . . SN. Also in the loop, the B variable may be calculated based at least in part upon accumulated CRC operations involving the strings SA . . . SN, after the strings SA . . . SN have first been rotated by a certain number of bits. In the loop, after the operations involving calculating the B variable, the accumulator variable may undergo repeated iterations of one or more arithmetic and/or logical operations in which the accumulator variable may be combined with and/or modified by the strings SA . . . SN, after the strings SA . . . SN have first been rotated by the certain number of bits. Thereafter, in a final operation, the B variable may undergo an accumulated CRC operation involving the accumulator variable. Variations of the foregoing may involve, for example, different predetermined numbers of bits, different certain numbers of bits, and/or different arithmetic and/or logical operations that may be used to modify the accumulator variable. For example, in one such variant, the predetermined number of bits may be equal to 19, the certain number of bits may be equal to 31, and/or the one or more arithmetic and/or logical operations may comprise an XOR of the current accumulator variable with a rotation left by 31 bits of the current one of the respective strings SA . . . SN (i.e., that is subject to the loop). In this variant, immediately prior to the final operation, the accumulator variable may undergo a final iteration of this arithmetic and/or logical operation.

Thus, in an embodiment, circuitry may generate digests to be combined to produce a hash value. The digests may include at least one digest and at least one other digest generated based at least in part upon at least one CRC value and at least one other CRC value. The circuitry may include cyclical redundancy check (CRC) generator circuitry to generate the at least one CRC value based at least in part upon at least one input string. The CRC generator circuitry also may generate the at least one other CRC value based least in part upon at least one other input string. The at least one other input string resulting at least in part from at least one pseudorandom operation involving, at least in part, the at least one input string.

Advantageously, this embodiment may exhibit and/or permit meaningful improvement in the speed and/or efficiency of searching of a data store and/or database. Advantageously, the digests and/or hash value generated in this embodiment may exhibit and/or be characterized by relatively few collisions. Also advantageously, the operations (such as CRC operations, accumulated CRC operations, logical operations, and/or arithmetic operations) employed in this embodiment may consume relatively few compute cycles and/or bandwidth, and be able to operate efficiently upon variable length inputs. Further advantageously, each of the digests D1 and/or D2 may exhibit relatively low mutual correlation (e.g., with respect to each other), as well as, relatively low correlation when concatenated to produce hash value 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Indeed, without departing from this embodiment, system 100 may include more or fewer than the elements shown in the Figures and described previously herein as being comprised system 100.

Other modifications and/or variations are also possible. For example, digests D11 and D2 may comprise and/or be based at least in part upon one or more additional digests generated based at least in part upon at least two functions (e.g., the one or more logical operations and/or non-CRC operation that may be comprised in non-CRC combining function 506, respectively). As was discussed previously in connection in FIG. 5, non-CRC combining function 506 may produce and/or output a modification of one or more strings 124 by and/or as a result of performing an XOR of blocks 501A . . . 501N of one or more strings 124. Non-CRC combining function 506 may perform a non-CRC operation, involving the previous outputs of the non-CRC combining function 506, on this modification of string 124. After all of the blocks 501A . . . 501N have been processed, one or more combiner operations 520 may generate digests D1 and/or D2, and/or one or more hash values 101 by combining the last output of non-CRC combining function 506 in and/or with digests D1 and/or D2, and/or one or more hash values 101. Alternatively or additionally, the last output may be used in other and/or additional ways by one or more operations 520 to produce digests D1 and/or D2, and/or one or more hash values 101.

Also, in this embodiment, strings SA . . . SN and/or segments SEG A . . . SEG N may be or comprise one or more non-zero integer multiples of a particular data block size, and CRC generator circuitry 120 may operate upon such strings and/or segments. However, if the final string SN and/or final segment SEG N comprise less than this particular block size, CRC generator circuitry 120 may generate and/or operate upon an alternate final string SN and/or segment SEG N. This alternate final string SN and/or segment SEG N may be, comprise, and/or correspond to the particular block size. The alternate final string SN and/or segment SEG N may comprise the original final string SN and/or segment SEG N together with other data from another string (e.g., SA or SB) and/or segment (e.g., SEG A or SEG B) previously operated upon by circuitry 120 that is sufficient to make the alternate final string and/or segment equal to the particular block size.

Additionally, in this embodiment, the respective iterations of functions Fn and/or non-CRC combining function 506 may utilize, as inputs, in their respective computations, one or more respective constants that may be different in (e.g., two or more of) these respective iterations. These respective constants may be chosen arbitrarily and/or generated pseudorandomly, but after being chosen and/or generated may be fixed thereafter as constants. Additionally or alternatively, initial values of the A and B variables may be chosen arbitrarily or pseudorandomly generated, instead of being hardcoded. Advantageously, these features may permit different operations (e.g., hash-related operations) to be employed in this embodiment.

Yet other and/or additional modifications, variations, and/or alternatives are possible. Accordingly, the claims are intended to cover all such equivalents.

What is claimed is:

1. An apparatus comprising:
   circuitry, comprised at least in part, in a network interface controller, to generate digests to be combined to produce a hash value, the hash value to be used to access one or more tuples in one or more databases, the one or more tuples comprising mutually-associated values that are associated, at least in part, with network entity destination information to be included in a packet that is to be transmitted in a network, the digests comprising at least one digest and at least one other digest, the at least one digest and the at least one other digest being generated based at least in part upon at least one CRC value and at least one other CRC value, the circuitry comprising cyclical redundancy check (CRC) generator circuitry to generate the at least one CRC value based at least in part upon at least one input string, the CRC generator circuitry also to generate the at least one other CRC value based least in part upon at least one other input string, the at least one other input string resulting at least in part from at least one pseudorandom operation involving, at least in part, the at least one input string.

2. The apparatus of claim 1, wherein:
   the at least one input string comprises respective input strings that correspond to respective segments of data to be hashed;
   the at least one CRC value comprises at least one accumulated CRC value calculated based at least in part upon the respective input strings; and
   the at least one pseudorandom operation comprises arithmetic and logical operations.

3. The apparatus of claim 1, wherein:
   the at least one input string comprises respective input strings that correspond to respective segments of data to be hashed;
   the at least one pseudorandom operation comprises an intermediate accumulated CRC operation and an exclusive-or (XOR) operation;
   the intermediate accumulated CRC operation is to generate respective accumulated CRC values based at least in part upon respective rotations of the respective input strings;
   the XOR operation is to generate, for each respective input string, a current respective output value of the XOR operation by XOR of a previous respective output value of the XOR operation with the respective input string; and the at least one other CRC value comprises at least one accumulated CRC value calculated based at least in part upon the respective accumulated CRC values and the current respective output value of the XOR operation.

4. The apparatus of claim 1, wherein:
   the circuitry to generate the digests is to concatenate the at least one digest with the at least one other digest to produce the hash value;
   the CRC generator circuitry is to generate the at least one CRC value and the at least one other CRC value as a result, at least in part, of execution of one or more respective instances of a CRC instruction.

5. The apparatus of claim 1, wherein:
   the at least one input string comprises respective input strings that correspond to respective segments of data to be hashed;
   the circuitry to generate the digests is to access the respective segments based at least in part upon respective pointers;
   the respective pointers includes at least one pointer to be used to access a final segment comprised in the respective segments, the at least one pointer being initially generated based at least in part upon at least one arithmetic operation involving at least one other of the respective pointers; and
   the circuitry to generate the digests is to modify the at least one pointer, as initially generated, so as to permit the final segment to be correctly accessed.

6. The apparatus of claim 1, wherein:
   the at least one input string comprises respective input strings that correspond to respective segments of data to be hashed;
   the circuitry to generate the digests is to access the respective input strings based at least in part upon at least one pointer; and
   the circuitry to generate the digests is to modify the at least one pointer depending upon whether the data straddles two or more memory pages.

7. The apparatus of claim 1, wherein:
   the digests also comprise at least one additional digest generated based at least in part upon a first function and a second function, the first function producing a modification of the at least one input string, the second function performing a non-CRC operation upon the modification.

8. The apparatus of claim 1, wherein:
   the at least one other digest comprises at least two digests generated based at least in part upon pseudorandom operations to generate modifications of the at least one input string, and CRC operations involving the modifications; and
   the digests also comprise at least one additional digest generated based at least in part upon a non-CRC function operating upon another modification of the at least one input string.

9. The apparatus of claim 1, wherein:
   the at least one input string comprises respective input strings that correspond to respective segments of data to be hashed;
   the CRC generator circuitry is to operate upon at least one non-zero integer multiple of a particular block size; and
   if the final segment comprises less than the particular block size, the CRC generator circuitry is to operate upon another segment that corresponds to the particular block size, the another segment comprising the final segment and other data that has been previously operated upon by the CRC generator circuitry.

10. The apparatus of claim 1, wherein:
the digests are generated based at least in part upon multiple iterations of functions that utilize, as inputs, one or more constants that are different in different respective iterations of the multiple iterations.

11. A method comprising:
generating, by circuitry, digests to be combined to produce a hash value, the circuitry being comprised at least in part in a network interface controller, the hash value to be used to access one or more tuples in one or more databases, the one or more tuples comprising mutually-associated values that are associated, at least in part, with network entity destination information to be included in a packet that is to be transmitted in a network, the digests comprising at least one digest and at least one other digest, the at least one digest and the at least one other digest being generated based at least in part upon at least one CRC value and at least one other CRC value, the circuitry comprising cyclical redundancy check (CRC) generator circuitry to generate the at least one CRC value based at least in part upon at least one input string, the CRC generator circuitry also to generate the at least one other CRC value based least in part upon at least one other input string, the at least one other input string resulting at least in part from at least one pseudorandom operation involving, at least in part, the at least one input string.

12. The method of claim 11, wherein:
the at least one input string comprises respective input strings that correspond to respective segments of data to be hashed;
the at least one CRC value comprises at least one accumulated CRC value calculated based at least in part upon the respective input strings; and
the at least one pseudorandom operation comprises arithmetic and logical operations.

13. The method of claim 11, wherein:
the at least one input string comprises respective input strings that correspond to respective segments of data to be hashed;
the at least one pseudorandom operation comprises an intermediate accumulated CRC operation and an exclusive-or (XOR) operation;
the intermediate accumulated CRC operation is to generate respective accumulated CRC values based at least in part upon respective rotations of the respective input strings;
the XOR operation is to generate, for each respective input string, a current respective output value of the XOR operation by XOR of a previous respective output value of the XOR operation with the respective input string; and
the at least one other CRC value comprises at least one accumulated CRC value calculated based at least in part upon the respective accumulated CRC values and the current respective output value of the XOR operation.

14. The method of claim 11, wherein:
the circuitry to generate the digests is to concatenate the at least one digest with the at least one other digest to produce the hash value;
the CRC generator circuitry is to generate the at least one CRC value and the at least one other CRC value as a result, at least in part, of execution of one or more respective instances of a CRC instruction.

15. The method of claim 11, wherein:
the at least one input string comprises respective input strings that correspond to respective segments of data to be hashed;
the circuitry to generate the digests is to access the respective segments based at least in part upon respective pointers;
the respective pointers includes at least one pointer to be used to access a final segment comprised in the respective segments, the at least one pointer being initially generated based at least in part upon at least one arithmetic operation involving at least one other of the respective pointers; and
the circuitry to generate the digests is to modify the at least one pointer, as initially generated, so as to permit the final segment to be correctly accessed.

16. The method of claim 11, wherein:
the at least one input string comprises respective input strings that correspond to respective segments of data to be hashed;
the circuitry to generate the digests is to access the respective input strings based at least in part upon at least one pointer; and
the circuitry to generate the digests is to modify the at least one pointer depending upon whether the data straddles two or more memory pages.

17. Computer-readable memory storing one or more instructions that when executed by a machine result in performance of operations comprising:
generating, by circuitry, digests to be combined to produce a hash value, the circuitry being comprised at least in part in a network interface controller, the hash value to be used to access one or more tuples in one or more databases, the one or more tuples comprising mutually-associated values that are associated, at least in part, with network entity destination information to be included in a packet that is to be transmitted in a network, the digests comprising at least one digest and at least one other digest, the at least one digest and the at least one other digest being generated based at least in part upon at least one CRC value and at least one other CRC value, the circuitry comprising cyclical redundancy check (CRC) generator circuitry to generate the at least one CRC value based at least in part upon at least one input string, the CRC generator circuitry also to generate the at least one other CRC value based least in part upon at least one other input string, the at least one other input string resulting at least in part from at least one pseudorandom operation involving, at least in part, the at least one input string.

18. The computer-readable memory of claim 17, wherein:
the at least one input string comprises respective input strings that correspond to respective segments of data to be hashed;
the at least one CRC value comprises at least one accumulated CRC value calculated based at least in part upon the respective input strings; and
the at least one pseudorandom operation comprises arithmetic and logical operations.

19. The computer-readable memory of claim 17, wherein:
the at least one input string comprises respective input strings that correspond to respective segments of data to be hashed;
the at least one pseudorandom operation comprises an intermediate accumulated CRC operation and an exclusive-or (XOR) operation;
the intermediate accumulated CRC operation is to generate respective accumulated CRC values based at least in part upon respective rotations of the respective input strings;
the XOR operation is to generate, for each respective input string, a current respective output value of the XOR operation by XOR of a previous respective output value of the XOR operation with the respective input string; and the at least one other CRC value comprises at least one accumulated CRC value calculated based at least in part upon the respective accumulated CRC values and the current respective output value of the XOR operation.

20. The computer-readable memory of claim 17, wherein:
the circuitry to generate the digests is to concatenate the at least one digest with the at least one other digest to produce the hash value;
the CRC generator circuitry is to generate the at least one CRC value and the at least one other CRC value as a result, at least in part, of execution of one or more respective instances of a CRC instruction.

21. The computer-readable memory of claim 17, wherein:
the at least one input string comprises respective input strings that correspond to respective segments of data to be hashed;
the circuitry to generate the digests is to access the respective segments based at least in part upon respective pointers;
the respective pointers includes at least one pointer to be used to access a final segment comprised in the respective segments, the at least one pointer being initially generated based at least in part upon at least one arithmetic operation involving at least one other of the respective pointers; and
the circuitry to generate the digests is to modify the at least one pointer, as initially generated, so as to permit the final segment to be correctly accessed.

22. The computer-readable memory of claim 17, wherein:
the at least one input string comprises respective input strings that correspond to respective segments of data to be hashed;
the circuitry to generate the digests is to access the respective input strings based at least in part upon at least one pointer; and
the circuitry to generate the digests is to modify the at least one pointer depending upon whether the data straddles two or more memory pages.

23. The computer-readable memory of claim 17, wherein:
the digests also comprise at least one additional digest generated based at least in part upon a first function and a second function, the first function producing a modification of the at least one input string, the second function performing a non-CRC operation upon the modification.

24. The computer-readable memory of claim 17, wherein:
the at least one other digest comprises at least two digests generated based at least in part upon pseudorandom operations to generate modifications of the at least one input string, and CRC operations involving the modifications; and
the digests also comprise at least one additional digest generated based at least in part upon a non-CRC function operating upon another modification of the at least one input string.

25. The computer-readable memory of claim 17, wherein:
the at least one input string comprises respective input strings that correspond to respective segments of data to be hashed;
the CRC generator circuitry is to operate upon at least one non-zero integer multiple of a particular block size; and
if the final segment comprises less than the particular block size, the CRC generator circuitry is to operate upon another segment that corresponds to the particular block size, the another segment comprising the final segment and other data that has been previously operated upon by the CRC generator circuitry.

* * * * *